L. P. STRONG.
VACUUM TRAP.
APPLICATION FILED OCT. 12, 1908.

957,269.

Patented May 10, 1910.
2 SHEETS—SHEET 1.

WITNESSES:

INVENTOR
Leslie P. Strong
BY J. B. Fay
ATTORNEY

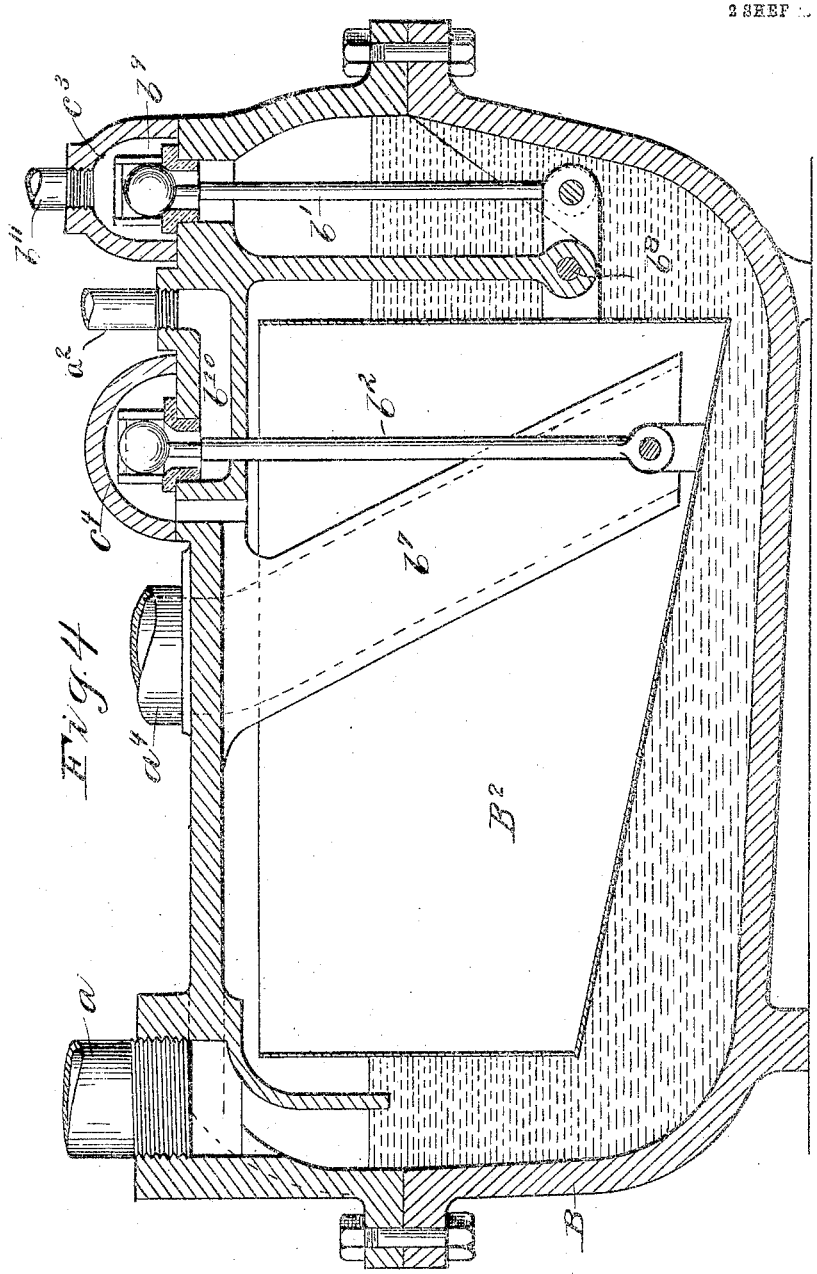

UNITED STATES PATENT OFFICE.

LESLIE P. STRONG, OF CLEVELAND, OHIO, ASSIGNOR TO THE CLARK MANUFACTURING COMPANY, OF CLEVELAND, OHIO, A CORPORATION OF OHIO.

VACUUM-TRAP.

957,269.  Specification of Letters Patent.  Patented May 10, 1910.

Application filed October 12, 1908. Serial No. 457,207.

*To all whom it may concern:*

Be it known that I, LESLIE P. STRONG, a citizen of the United States, resident of Cleveland, county of Cuyahoga, and State of Ohio, have invented a new and useful Improvement in Vacuum-Traps, of which the following is a specification, the principle of the invention being herein explained and the best mode in which I have contemplated applying that principle, so as to distinguish it from other inventions.

Wherever condensing steam engines are operated with the condenser or any part of the piping or connections between the condenser and cylinder, situated above the bottom of the latter, there always exists a constant danger of sooner or later seriously damaging or wrecking the engine, unless some means are provided for automatically removing the water of condensation from the vacuum system, so as to keep th line free from water before and after the va uum has been established. It has only been recently recognized that a number of difficulties in the operation of condensing steam engines could be traced to the cause above explained, and several types of vacuum traps have been devised, with the object in view of thus automatically draining the water of condensation from the system. Traps operating under the conditions that obtain in such a system, encounter various operative difficulties, which so far as I am aware have not been successfully overcome in structures heretofore put forth. With the object, then, of providing a vacuum trap that will successfully withstand the sudden changes in temperatures and pressures that occur in a vacuum system and one, the valve of which will always be freely operable as well as readily accessible should occasion demand, I have devised the trap consisting of the means hereinafter fully described and particularly pointed out in the claims.

The annexed drawings and the following description set forth in detail certain mechanism embodying the invention, such disclosed means constituting, however, but several of the various mechanical forms in which the principle of the invention may be used.

Figure 1:
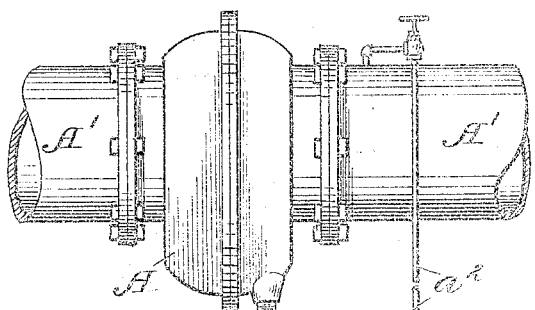
Figure 3:
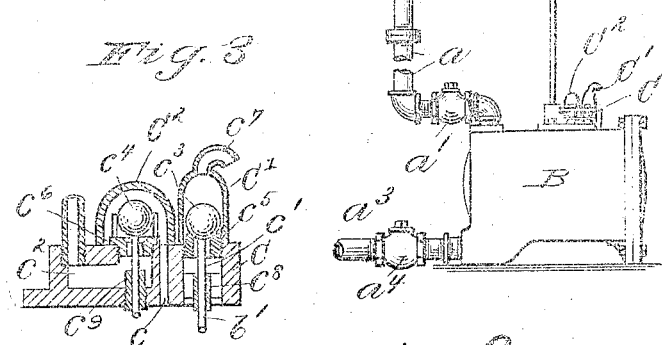
Figure 2:
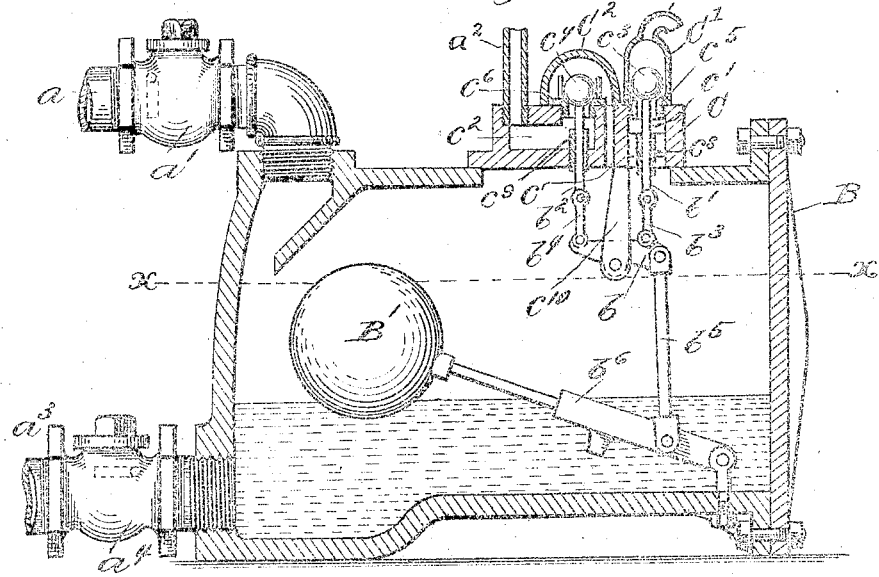

In said annexed drawings:—Figure 1 illustrates the installation of my improved vacuum trap to drain a vacuum oil separator; Fig. 2 is a vertical longitudinal section of the trap illustrated in Fig. 1; Fig. 3 illustrates a detail of such trap, likewise in section, but with the parts there shown in a different operative position, and Fig. 4 is a vertical longitudinal section of a modified form of the trap.

The chief difference between the two forms of trap illustrated respectively in Figs. 2 and 4, is the use in the former of a ball float for operating the control valve mechanism, in the second, of a bucket for the same purpose, such first trap being designed to discharge into a lower level, so that it will drain under simple atmospheric pressure, whereas the second trap is designed to discharge to a higher level, therefore requiring utilization of a pressure, preferably of steam, greater than atmospheric. Such additional pressure it will be understood is also sometimes employed even where the discharge could be effected by gravity, in order to increase the rate of discharge, and consequently the capacity of the trap.

In the typical installation illustrated in Fig. 1 where A designates a vacuum oil separator interposed in a vacuum line A', the inlet of the trap B is connected with the discharge of such separator by a pipe $a$ in which is included a check valve $a'$ that opens freely to the trap, but prevents any return movement through such pipe. The discharge of the trap, through a pipe $a^3$, is similarly controlled by a check-valve $a^4$ which, however, operates reversely, permitting the trap's contents to escape but preventing any back flow. Connected directly with the vacuum line itself, is another similar pipe or duct $a^2$ that leads to the valve casing C of the trap, the connection of such duct with the interior of the trap being more fully disclosed in the several sectional views of the two forms of trap.

Noting the first of these forms (Figs. 2 and 3) which, as has been stated, utilizes a ball float as the operative element, the valve casing C will be seen to comprise in effect two chambers $c'$ $c^2$, the first of which is adapted to communicate directly with the trap's interior, the other to communicate therewith through a duct $c$ in the casing as shown. Communication in each instance, however, may be cut off by ball valves $c^3$ and $c^4$ fitted to corresponding valve seats $c^5$ and $c^6$ in the respective passages, such valves resting normally freely on their seats. Those portions $C'$ $C^2$ of the casing $C$ inclosing the valves are made separately removable, so that upon such removal both the valves and the valve seats are laid open for inspection and removal if desired. Of such movable casing portions, the one $C'$ corresponding with valve $c^3$ communicates directly with the air, and is formed with a recurved extension $c^7$ to prevent the entrance of dust or other foreign matter. The tendency of the ball valves, of course, is to rest on their seats. To raise them therefrom, vertically reciprocable plungers $b'$ $b^2$ suitably held in bushings $c^8$ $c^9$ in the casing $C$ are provided, the lower ends of such plungers being respectively connected by means of links $b^3$ $b^4$ with a lever $b$ transversely disposed thereto, and pivoted to an arm $c^{10}$ depending from the casing. Such links being attached to the lever at points lying on opposite sides of the fulcrum thus provided, will obviously be oppositely actuated by movement of the lever. This movement is derived from the ball float $B'$ through another link $b^5$ connecting one end of the lever $b$ with the pivoted stem $b^6$ of the float.

Having thus described the construction of the trap, its mode of operation should be readily apparent. In the position of parts illustrated in Fig. 2, the trap is shown as discharging; discharge valve $a^4$ is hence open, and inlet valve closed, while of the two control valves, the one $c^4$ in the duct communicating with the vacuum line is closed, while the one $c^3$ leading to the atmosphere is open. The pressure of the atmosphere, it will be seen, serves both to close the inlet valve $a'$, and to retain control valve $c^4$ on its seat. By reason of the pressure thus exerted upon the control valve in question, the ball float will not follow at once the falling level of the liquid within the trap, but will sink only when the weight of the portion of the float above the water multiplied by the leverage obtained through its connection with the valve is sufficient to overcome the difference between the atmospheric and vacuum pressures, due regard being had to the area of the valve seat. When it does finally drop, the movement will, of course, be a sudden one, owing to the pressures on both sides of the valve being equalized so that the control valve $c^4$ is instantly removed from its seat and the companion valve seated. The situation is now reversed, for, the vacuum line being connected with the interior of the trap, the outlet valve is caused to close and the inlet valve permitted again to open, so that liquid from the separator A or other like device, can freely enter the trap. The liquid level within the trap accordingly now rises, but such rise will be ineffective to raise the atmospheric control valve $c^3$ until the buoyant action of the float is sufficient to overcome the disparity in pressures, whereupon the same sudden actuation of the two control valves again takes place. The level of liquid illustrated in Fig. 2 is that at which the first operation just described, is designed to take place, while the line $x$—$x$ illustrates the level that will be reached before the ball float becomes effective to lift the atmospheric valve. Fig. 3 shows the changed position of the control valves in the second operative stage above described.

In the modified construction illustrated in Fig. 4, a bucket $B^2$ is utilized as the actuating element, instead of a ball float, as has been explained, and accordingly the discharge from the trap requires to be differently disposed. Such discharge consists in fact, in a tube $b^7$ that extends well into the bottom of such bucket. The plungers $b'$ $b^2$ for actuating the control valves are preferably directly connected with the bucket, one within and the other without, so as to be on opposite sides of its fulcrum point $b^8$. Separate casings $C^3$ $C^4$, moreover are preferably provided for each of the valves corresponding with the removable casing portions $C'$ $C^2$ of the previous structure; and the chambers $b^9$ $b^{10}$, that correspond with chambers $c'$ $c^2$, are formed directly in the trap casing. Of these chambers the one $b^9$, instead of opening to the air, is connected with a source of pressure supply, generally steam, by a pipe $b^{11}$ so that the disparity between the two pressures that are alternately provided within the trap is considerably increased. By means of the greater pressure thus secured, the contents of the trap upon being discharged therefrom, may be raised to a correspondingly higher level, as will be understood, and it is chiefly because of this high pressure that it is desirable to employ a bucket, since a hollow float might be crushed under the load and change in temperature.

The operation of the second form of trap should not require separate explanation, since it follows exactly that of the preceding form, in so far as the control valves are actuated by the changing liquid-level in the trap. The level shown in Fig. 4 is intended to represent the low water line.

It will be evident in view of what has been said above that a highly advantageous effect is secured by hindering, as it were, the movement of the float, whether bucket or hollow ball, by the difference in the two pressures employed in connection with the trap instead of by an unstable equilibrium device as heretofore; for not only may a greater difference in levels within the trap, and a consequent increased discharge capacity be secured, but the movement of the control valves is made practically instantaneous, the one being tossed up, and the other allowed to fall onto its seat simultaneously. There is hence no leakage with consequent rapid deterioration of the valves and their seats.

It has not been deemed necessary to illustrate more than the one installation of the trap; the mode of connecting it to drain the exhaust lines of condensing engines, to feed water heaters situated between the engine and condenser, or the like, will be readily understandable therefrom. It, likewise, is scarcely necessary to remark that the herein-described apparatus can be used not only for discharging water from a vacuum or partial vacuum against atmospheric pressure, but by a suitable arrangement of the check valves on the inlet and discharge pipes, it may be adapted to discharge water or other liquid into a receptacle wherein a vacuum or partial vacuum exists.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A vacuum trap comprising a casing having a liquid inlet and discharge, vacuum and pressure connections with the casing interior, outwardly opening control valves in said connections, respectively, the pressure tending to close said valves, and means operated by changing liquid-level in said casing to alternately open said valves.

2. A vacuum trap comprising a casing having a liquid inlet and discharge, vacuum and pressure connections with the casing interior, outwardly opening ball valves adapted to control said connections, respectively, the pressure tending to seat said valves, and means operated by changing liquid-level in said casing to alternately raise said valves from their seats.

3. A vacuum trap comprising a casing having a liquid inlet and discharge, vacuum and pressure connections with the casing interior, ball valves adapted to control said connections, respectively, the pressure tending to seat said valves, reciprocable plungers adapted to engage the latter to raise them from their seats, and float means operated by changing liquid level in said casing and connected to reciprocate said plungers in opposite directions.

4. A vacuum trap comprising a casing having a liquid inlet and discharge, vacuum and pressure connections with the casing interior, ball valves adapted to control said connections, respectively, the pressure tending to seat said valves, reciprocable plungers adapted to engage the latter to raise them from their seats, and float means operated by changing liquid level in said casing and connected to reciprocate said plungers in opposite directions, the plunger for raising the vacuum control valve being thus actuated upon such liquid-level falling and the other plunger upon such level rising.

5. A vacuum trap comprising a casing having a liquid inlet and discharge, vacuum and atmospheric connections with the casing interior, ball valves adapted to control said connections, respectively, the atmospheric pressure tending to seat said valves, plungers adapted to engage the latter to raise the same from their seats, and float means operated by changing liquid-level in said casing and including a lever member, said plungers being connected with points on said lever lying on opposite sides of said lever's fulcrum, the plunger for raising the vacuum control valve being thus actuated upon such liquid-level falling and the other plunger upon such level rising.

6. A vacuum trap comprising a casing having a liquid inlet and discharge, vacuum and atmospheric connections with the casing interior, ball valves adapted to control said connections, the atmospheric pressure tending to seat said valves, plungers adapted to engage the latter to raise the same from their seats, a lever disposed transversely of said plungers and pivoted intermediately of its ends, links connecting such ends with said plungers, respectively, a ball float with a stem pivotally mounted within the trap casing, and a link connecting said float stem with said lever, so as to actuate the proper plunger to raise the vacuum control valve upon the liquid-level in the casing falling and the other plunger upon such level rising.

7. A vacuum trap comprising a casing having a liquid inlet and discharge, a supplementary casing provided with passages leading into the interior of said trap-casing and respectively connected with the vacuum line and opening into the atmosphere, said supplementary casing comprising removable caps including portions of said passages, valve seats in said passages disposed to be uncovered upon removal of said caps, ball valves within said caps fitted to said seats, plungers adapted to engage said valves to raise the same from their seats, a lever disposed transversely of said plungers and pivoted intermediately of its ends, links connecting such ends with said plungers, respectively, a ball float with a stem pivotally mounted within the trap casing, and a link connecting said float stem with said lever, so as to actuate the proper plunger to raise the vacuum control valve upon the liquid-level in the casing falling and the other plunger upon such level rising.

Signed by me, this 9th day of October, 1908.

LESLIE P. STRONG.

Attested by—
 CHRISTINE E. ARNS,
 JNO. F. OBERLIN.